Feb. 19, 1935.     N. W. ELMER     1,991,887
CONVEYER
Filed Jan. 12, 1933
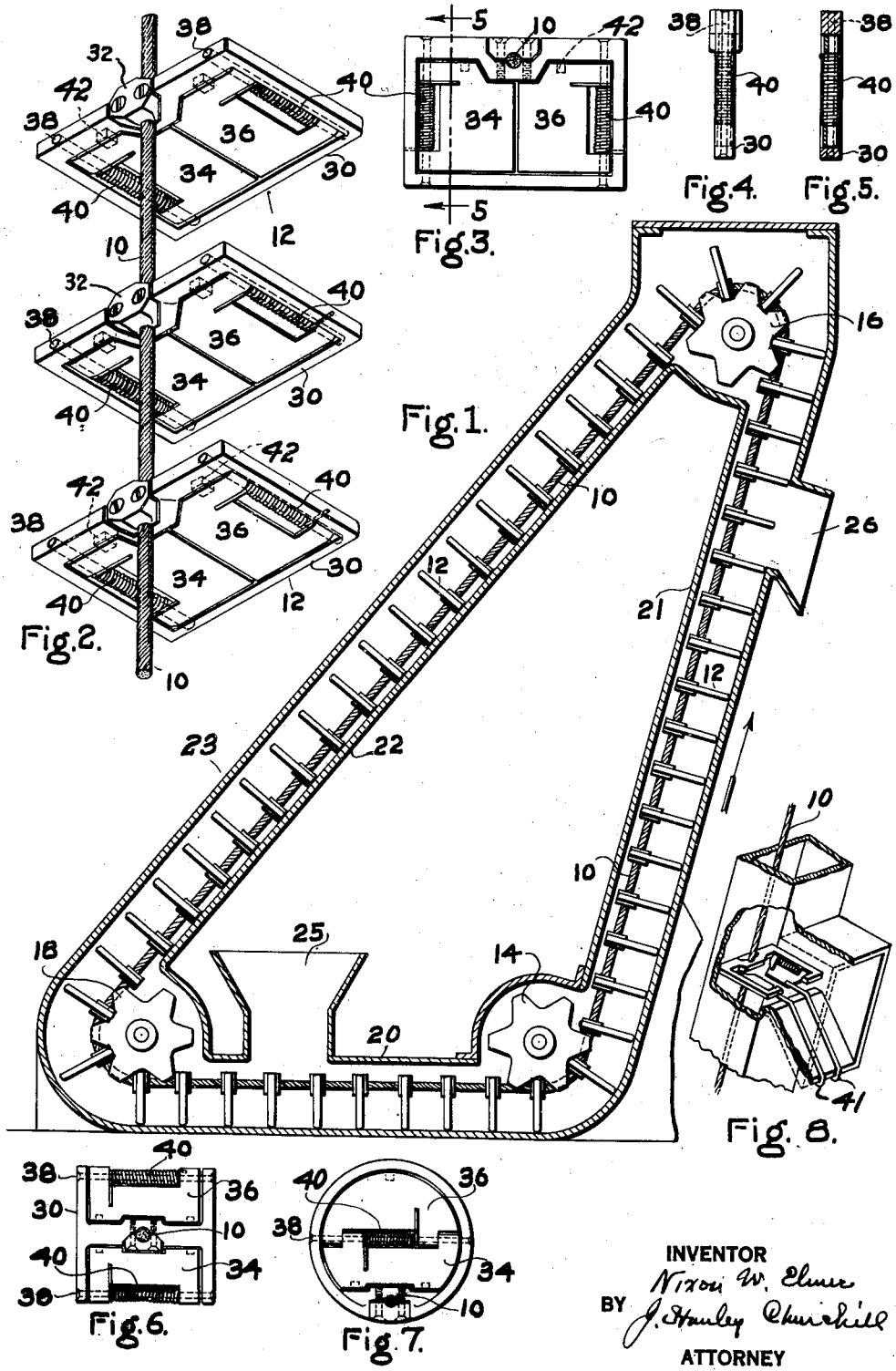
INVENTOR
Nixon W. Elmer
BY J. Hanley Churchill
ATTORNEY Patented Feb. 19, 1935

1,991,887

UNITED STATES PATENT OFFICE 1,991,887

CONVEYER

Nixon W. Elmer, Oak Park, Ill., assignor to Redler Conveyor Company, Quincy, Mass., a corporation of Massachusetts Application January 12, 1933, Serial No. 651,332

5 Claims. (Cl. 198—168)

This invention relates to a conveyer which is particularly adapted for use in conveying flowable solid material.

The object of the invention is to provide a novel and efficient conveyer for the purpose specified, and which possesses the advantages of a solid flight conveyer without the disadvantages which have heretofore been inherent in the solid flight type of conveyer.

With this general object in view and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a vertical sectional view of a conveyer embodying the present invention; Fig. 2 is a detail in perspective of the conveying element illustrating the construction of the flights mounted thereon; Fig. 3 is a plan view of one of the flights; Fig. 4 is an end elevation of the same; Fig. 5 is a sectional detail on the line 5—5 of Fig. 3; Figs. 6 and 7 are details in plan of modified forms of flights; and Fig. 8 is a detail to be referred to.

The present invention contemplates a conveyer comprising a conduit having a conveying element associated therewith to be drawn therethrough to effect the conveyance of the flowable solid material through the conduit. The conveying element is in accordance with the present invention provided with a plurality of solid flights of novel and improved construction mounted at spaced intervals on the conveying element, and provision is made for introducing material into the conduit and for permitting the material to discharge therefrom at different points along the conduit. In order to enable the conveyer to be used for the conveyance of various materials and to overcome difficulties which have heretofore been inherent in solid flight conveyers of the prior art, the flights of the present conveyer are constructed to be capable of being converted under certain conditions of use from a solid flight to an open structure to prevent jamming of the conveyer. This construction of the present flight enables the conveyer to be discharged more readily than the solid flight type of conveyers of the prior art, and in its preferred form the invention is adapted for use in transporting materials with the advantages of the open flight type of conveyer illustrated in and forming the subject of the Redler Reissue Patent No. 18,445. The convertible flights are also adapted for use with advantage in connection with other flights of either closed or open structure.

Referring now to the drawing in the illustrated conveyer a conveying element herein shown as a cable 10 having a series of flights 12 mounted at spaced intervals thereon is arranged to run over pulleys 14, 16, 18, to draw the conveying element through the legs 20, 21, 22 of a conduit indicated generally at 23. One of the pulleys is driven from any suitable source of power in accordance with known practice, and provision is made for introducing the flowable solid material to be conveyed into the conduit at one point as through the inlet 25, and also for discharging the material at another point, for example as through the discharge opening 26.

In accordance with the present invention, in the illustrated conveyer the flights 12 for conveying the material are constructed to be capable of conversion from closed to open structure, under different operating conditions as will be described, and as illustrated in Figs. 2, 3, 4 and 5, each flight 12 comprises an outer metal frame 30 having a clamp 32 for engaging and clamping the frame to the cable 10.

The outer metal frame 30 of each flight may take a rectangular form, such as is shown in Figs. 2 and 3, and is provided with two plate-like members 34, 36, pivoted upon pins 38 secured in the framework, as shown, and the plates are yieldingly held in a position to cooperate with the open frame to form in effect a solid flight by coil springs 40 encircling the pins 38. In the illustrated form the plates are restrained from upward movement by stops 42 formed as a part of the frame.

As set forth in the Redler Reissue Patent No. 18,445, above referred to, the flights of the conveyer disclosed in such patent may take varying forms, and as illustrated in Figs. 6 and 7 hereof, the metal frame 30 of the present flight may be of H-shape or circular, and in order to adapt such metal frame to a flight embodying the present invention, the two plates 34, 36 may and preferably will be constructed as shown in Figs. 6 and 7 to cooperate with the H-shaped and circular form of frame to form a solid flight when the plates are in their closed position. In the circular form illustrated in Fig. 7 only a single pin 38 need be used and both plates hinged upon the common pin and held in their closed position against the stops by the ends of a single helical spring encircling the pin.

In the operation of the conveyer, the material being introduced through the inlet is conveyed by the solid flights formed by the cooperating frame and the two plates in their closed position, and by providing springs of sufficient strength the flights are arranged to function as solid flights so long as the conveyer continues to operate in a normal condition. In the event, however, that a jam occurs at any point in the conveyer for any reason, if for example, the discharge or outlet port is closed, then as the cable 10 continues to be drawn through the conduit, the resistance of the material on the plates operates to overcome the springs 40 and permit the plates 34, 36 to pivot and open, thereby enabling the conveyer to continue to be pulled through the material without jamming, reducing to a minimum the danger of breaking the cable, and permitting the conveyer to operate in a similar manner as the conveyer illustrated in the Redler Reissue Patent No. 18,445, above referred to. When the outlet port is again opened the conveyer flights are again converted into solid flights.

The convertible construction of flight also finds particular use in enabling the conveyer to be discharged with more efficiency, completeness and facility. The hinged or pivotal plates 34, 36 may be arranged to be mechanically opened by any suitable means as each flight reaches the discharge port or outlet in the conveyer casing, thereby enabling the material to be freely discharged irrespective of the exact location of the discharge outlet, whereas with a non-convertible solid flight conveyer, the location of the discharge outlet for most efficient discharge of material is restricted to a horizontal run of the conveyer. As illustrated in Fig. 8, the frames of the flights may be made discontinuous as shown, and the hinged plates arranged to engage fixed lugs 41, to cause the plates to swing downwardly as each flight reaches the discharge outlet.

While the preferred embodiments of the invention have been herein illustrated and described, it will be understood that the invention may be embodied in other forms within the scope of the following claims.

Having thus described the invention, what is claimed is:—

1. A conveyer for transporting flowable solid material comprising a casing provided with an inlet and an outlet, and a conveying element adapted to be drawn through the casing and provided with a plurality of spaced transversely extended conveyer flights, each flight comprising a frame, and closure members movably mounted upon the frame and normally forming with the frame a flight of the solid type, said closure members being mounted to be capable of movement into an open position under certain conditions of use.

2. A conveyer for transporting flowable solid material comprising a casing provided with an inlet and an outlet, and a conveying element adapted to be drawn through the casing and provided with a plurality of spaced transversely extended conveyer flights, each flight comprising a frame, and closure members movably mounted upon the frame and normally forming with the frame a flight of the solid type, said closure members being mounted to be capable of movement into an open position under certain conditions of use, and means for operating said closure members to open the same when they reach the outlet from the conveyer casing.

3. A conveyer for transporting flowable solid material comprising a casing provided with an inlet and an outlet, a conveyer element adapted to be drawn through the casing provided with a plurality of spaced apart conveyer flights, said conveyer flights comprising an open frame and pivoted closure members, and yielding means for normally retaining the closure members in a position to cooperate with the frame to form in effect a solid flight, said yielding means being of such strength as to permit the closure members to open when the movement of the conveying element meets abnormal resistance.

4. A conveyer for transporting flowable solid material comprising a casing provided with an inlet and an outlet, and a conveying element adapted to be drawn through the casing and having a plurality of spaced transversely extended conveyer flights, some of said flights being provided with a portion movable with relation to the conveying element, and abutment means for cooperating with the movable portion of said flights to cause movement of the same when the flights reach the outlet from the conveyer casing to thereby facilitate discharge of material through said outlet.

5. A conveyer for transporting flowable solid material comprising a casing provided with an inlet and an outlet, and a conveying element adapted to be drawn through the casing and having a plurality of spaced transversely extended conveyer flights, each flight being capable of conversion from closed to open structure, and means operating said flights to convert them to open structure when they reach the outlet from the conveyer casing to thereby facilitate discharge of material therethrough.

NIXON W. ELMER.